United States Patent [19]
Steckler et al.

[11] Patent Number: 6,052,884
[45] Date of Patent: Apr. 25, 2000

[54] CONVEYORIZED SYSTEM FOR REBUILDING TREAD AND DISC BRAKE ACTUATOR UNITS FOR USE IN RAILWAY CARS

[75] Inventors: Adam Steckler, Newark; Charlie Pope; Norris Macklin, both of Wilmington; John J. Hannaford, Newark, all of Del.; Karl Ginther, Collegeville, Pa.

[73] Assignee: National Railroad Passenger Corporation, Washington, D.C.

[21] Appl. No.: 08/886,129

[22] Filed: Jun. 30, 1997

[51] Int. Cl.[7] .................................................. B23Q 17/00
[52] U.S. Cl. ..................... 29/407.08; 29/705; 198/435; 198/447
[58] Field of Search ................. 29/407.08, 705; 198/435, 447

[56] References Cited

U.S. PATENT DOCUMENTS

| | | |
|---|---|---|
| 2,896,314 | 7/1959 | Goodwin et al. |
| 4,003,466 | 1/1977 | Muth et al. ............................... 198/452 |
| 4,880,026 | 11/1989 | Ferre et al. ........................... 137/234.6 |
| 5,557,834 | 9/1996 | Miyanaka et al. ..................... 29/407.5 |
| 5,569,606 | 10/1996 | Fine et al. .................................. 436/43 |

Primary Examiner—P. W. Echols
Assistant Examiner—John C. Hong
Attorney, Agent, or Firm—Lowe Hauptman Gopstein Gilman & Berner

[57] ABSTRACT

A conveyorized system and method of use therefor for disassembling, inspecting, reconditioning and testing a brake actuator is disclosed. The disassembly area includes a spring removal fixture and a torque removal fixture. The conveyor system includes multi-level conveyor portions to eliminate the need for operators to lift awkward, heavy components. The test area includes a fixture adapted to pressure test and leak test a reconditioned brake actuator and to test for slack adjuster travel. The disclosed conveyor system is specially adapted to disassemble, inspect, recondition and test air brake actuators for trains, such as disc actuators and tread actuators.

13 Claims, 5 Drawing Sheets

CONVEYORIZED SYSTEM FOR REBUILDING TREAD AND DISC BRAKE ACTUATOR UNITS FOR USE IN RAILWAY CARS

TECHNICAL FIELD

The present invention relates generally to the disassembly, inspection and reassembly of heavy and bulky equipment containing a number of components and, more particularly, to a brake unit rebuild shop for the disassembly, inspection and/or repair or replacement, and assembly of components used in tread and/or disc brake actuator units on railway cars.

BACKGROUND ART

Passenger railroad cars are supported on wheeled trucks located beneath opposite ends of each cars. Each truck includes at least two pairs of wheels with each wheel pair being respectively interconnected with an axle at opposite ends thereof. A separate disc brake assembly and a separate tread brake assembly is mounted to the truck adjacent to each wheel in a well-known manner to impart a braking force to slow or stop the train.

Both the disc and the tread brakes utilize brake actuator units which are air actuated to extend piston and cylinder controlled disc and tread brake components into braking contact with the axle and wheels, respectively. The brake units also each include a slack adjuster mechanism that automatically adjusts the position of the brake components to account for wear during use. Examples of such disc and tread brakes used in railway cars are the Knorr PR-5 Amfleet 1 tread brake; the Knorr CK-8Z Amfleet 1 disc brake; the Wabco 3-P Amfleet 2 disc brake; and the Wabco GB-4½ Amfleet 2 tread brake.

The aforesaid brake assemblies are pressure tested frequently (e.g. daily) to ensure operability. If an assembly fails, it is immediately replaced and returned to a back shop, overhaul environment for overhaul and retesting. In addition, at less frequent intervals (e.g. every 3–4 years) as mandated by appropriate association of governmental control (e.g. the Association of American Railroads and the Federal Railroad Administration), the passenger coach cars are overhauled in the back shop environment, where all of the car components are replaced with new or reconditioned components.

During the overhaul process, in the past, each of the individual types of tread and disc brakes were disassembled into component parts, the components then cleaned, inspected, reconditioned or replaced, and then reassembled into rebuilt brake actuator units. The original rebuild process used by the Assignee of the present invention included up to four separate disassembly-cleaning-inspection-reassembly lines, one for each of the four above identified actuator units, each line being staffed with its own group of workers. Needless to say, this prior art process was disadvantageously labor and equipment intensive.

The brake actuators subject to reconditioning are large and heavy pieces of equipment. In the prior art processes noted above, significant physical exertion by workers was necessary to manually lift and move the actuators from one work area to another work area. In addition, in the disc brake actuator disassembly areas, difficulty was encountered in the removal of certain subassemblies in which either a large spring force must be relieved to facilitate removal of certain fasteners, or in which the threaded connection between certain threaded components 'froze' and locked, as a result of enormous torque forces imposed on the threaded connection during years of use of the brake actuators in the railway car trucks. In the past, for example, large chain wrenches were used in the disc brake subassembly areas to disassemble a piston sleeve housing which could potentially subject the worker to injury if the large chain wrench (e.g. 3'–4' in length) slipped from the relatively small bearing surface on the sleeve.

It is accordingly one object of the present invention to disassemble, inspect and rebuild multiple types of brake actuator units in a single conveyorized line.

Another object is to utilize the same work crew in each of the disassembly, inspection, and reassembly areas for each of the different types of brake actuator units being rebuilt.

Yet another object is to provide ergonomically safe areas to minimize excessive manual exertion and heavy lifting by the workers.

Yet another object is to provide novel types of apparatus to facilitate breakdown of large and heavy threaded components and subassemblies including spring biased components.

DISCLOSURE OF THE INVENTION

The present invention is possessed of numerous novel features capable of use either in combination with each other or as separate stand alone improvements in systems and processes for rebuilding large pieces of equipment having multiple components, such as brake actuator units used on railway cars. The manner in which the novel features of the invention may be used collectively or independently, in various combinations and sub-combinations, will become apparent to persons skilled in the art upon review of this specification.

In one aspect of the invention, there is disclosed a conveyorized system for disassembling, inspecting and rebuilding brake units used on railway cars. The conveyorized system comprises a disassembly station including a series of predetermined disassembly tools which are user operated to disassemble the brake unit into component parts. Following disassembly, the parts may be optionally cleaned and then conveyored to an inspection station which includes a series of predetermined inspection tools which are user operated to inspect predetermined parameters on selected ones of the components. At a repair station, having its own series of predetermined repair tools, predetermined ones of the components which have failed inspection will be repaired while others of said components may be replaced with new or rebuilt components separately supplied to the line. The components are then conveyored to an assembly station which includes a series of predetermined assembly tools to reassemble the unit with the inspected and repaired and/or replaced components. To ensure rapid throughput with minimum physical effort required by the workers, multi-level conveyors are provided between at least selected ones of the stations for conveyance of the component parts therebetween.

There are preferably provided a plurality of vertically movable surfaces for transferring components between selected ones of the stations and an infeed location of one of the conveyors associated therewith. These movable surfaces, preferably lift tables, enable workers to transfer heavy components, or a relatively large number of lighter components, from a work surface to a conveyor surface that are typically located at different elevations from each other.

Smaller components are typically provided in baskets which are placed on the conveyors for movement between stations and prevention of component loss. The use of baskets in this manner also facilitates the kitting of components used to reassembly an entire brake actuator unit and facilitates the more or less simultaneous and multiple rebuilding of a plural number of brake actuator units (e.g. four).

In accordance with another feature of the invention, each station includes first and second sub-areas respectively containing separate sets of the predetermined tools to enable the disassembly, inspection and reassembly of tread brake actuator units and disc brake actuator units in the respective sub-areas.

The brake actuator units include spring biased components and the disassembly station includes means for manipulating a spring in the units to remove spring force from a fastener in the unit to facilitate removal of the fastener and thereby the spring and selected ones of said components from the unit held together between the spring and fastener. In the preferred embodiment, such manipulating means preferably includes a cylinder operated plunger arranged to compress the spring while the other end of the spring biased component subassembly is held against the spring pressure to facilitate the removal of the spring force from the fastener.

Following assembly, the actuator units are transferred to a brake test fixture including a brake test having a mounting section to which the assembled brake actuator unit is mounted. Control means supplies pressurized air to the assembled unit and determines whether air pressure leakage occurs in the reassembled unit under a predetermined test pressure condition.

The brake test fixture also allows the worker to test for force application to ensure accurate reassembly of the piston, slack adjustment screw mechanism as well as other subassemblies within the force transmission path of the actuator unit.

In the disc brake disassembly area, the piston head and piston sleeve are threadedly engaged with each other through threads that have been previously secured together with adhesive material and may also be subject to partial welding as a result of the enormous torque forces generated during use of the brake actuator units in braking of a railway car. To 'unlock' the threads from each other, there is provided a unique apparatus having a clamp arranged to clamp against the piston head to secure the same against rotation. A motor including an output shaft having a means for connection to the piston sleeve is utilized to impart rotation to the sleeve through the shaft by the motor generating predetermined sufficient torque to unlock the threads. The connection means may preferably include a keyway interacting with the piston sleeve to interlock therewith and thereby impart rotative force.

In accordance with another unique feature of this invention, a production line assembly for disassembling, inspecting and rebuilding brake actuator units used on railway cars comprises a disassembly station including a series of predetermined disassembly tools which are user operated to disassemble a said unit into component parts. There is also provided an inspection station including a series of predetermined inspection tools which are user operated to inspect predetermined parameters on selected ones of the components. A repair station including a series of predetermined repair tools is used to repair the predetermined ones of the components and an assembly station including a series of predetermined assembly tools is provided to reassemble the unit with the inspection and repaired and/or replaced components. In accordance with this aspect of the invention, each station includes first and second sub-areas respectively containing separate sets of the predetermined tools to enable the disassembly, inspection and reassembly of tread brake actuator units and disc brake actuator units in the respective sub-areas.

Separate conveyors extend through the respective disc and brake actuator unit stations and, as necessary, these separate conveyors merge into common conveyors for certain types of other treatment of the components (e.g. washing).

In accordance with a different aspect of the invention, there is provided an apparatus for partial disassembly of preferably a brake actuator unit used on a railway car. The actuator unit includes spring biased components in which a spring biases a series of washers and a bearing together in a unit into a spring loaded condition maintained by means of a fastener member located in opposing relationship to the spring. The apparatus comprises a support on which at least a subassembly of the brake actuator unit is disposed and a pneumatic or hydraulically actuated plunger movable into the subassembly is arranged on the support to compress the spring. In this manner, compression of the spring with the plunger relieves spring force on the fastener member enabling an operator to remove the fastener and thereby remove the washers and bearing and spring from the subassembly when the plunger is retracted.

The foregoing apparatus is preferred for use on brake actuator units of the type described above. However, the apparatus mentioned hereinabove may be used on other types of spring loaded devices in which a spring must be compressed in order to remove the spring force from a fastener to facilitate detachment of the fastener for disassembly of the device.

Another feature of this invention having utility separate and apart from the overall production line is an apparatus for disassembling at least two components preferably of a brake actuator unit which is to be disassembled. The two components are threaded together and the threads of the components are secured together by at least partial welding and/or adhesive material. The apparatus comprises a clamp arranged to clamp one of said at least two components to secure the same against rotation. A motor including an output shaft having means for connection to the other of the at least two components is also provided. Rotation of the shaft by the motor is operable to generate predetermined sufficient torque to unthread the components from each other.

The second disclosed apparatus may also be used on products other than brake actuator units, such products including a spring loaded device with a piston head having a thread and a piston sleeve having another thread threadedly engaging the piston head and adhesively bonded or partially welded thereto.

In a different broader context, the present invention also concerns a method for reconditioning a spring loaded device. The method comprises the steps of disassembling the device into several components, conveying the several components to a washer, cleaning the several components, conveying the several components to an inspection/rework area and then inspecting the several components and reworking any components that fail the inspecting step. Following, the inspected/rework components are conveyed to an assembly area where the device is reassembled. The reassembled device is conveyed to a testing area where it is tested.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and that several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 1:
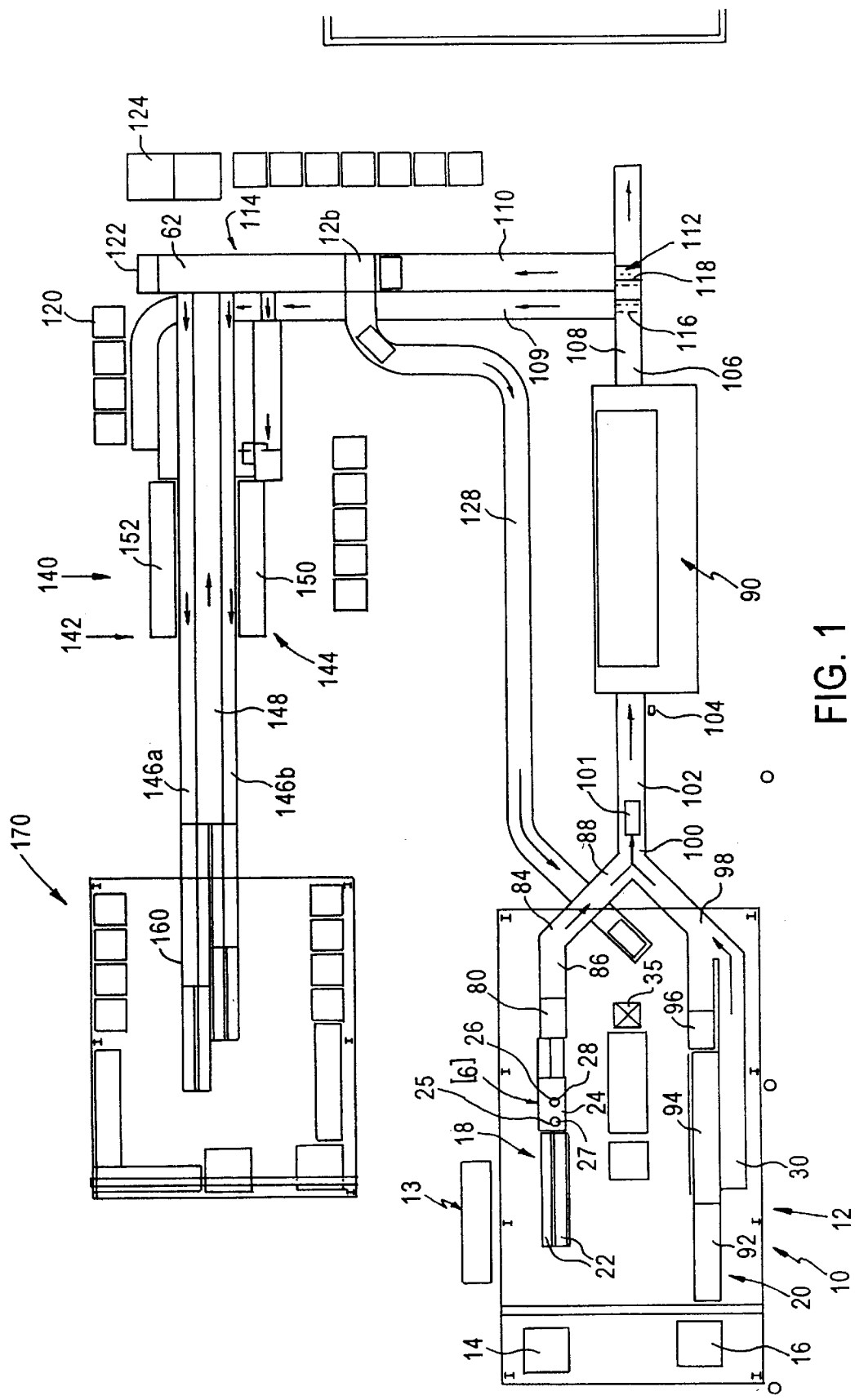
FIG. 1 is a plan view of a representative example of a brake actuator rebuilt shop in accordance with the present invention.

Reference is made to FIG. 1 where a conveyor system for reconditioning brake actuator units, generally indicated at 10, is illustrated which is constructed in accordance with the principles of the present invention. For convenience, the conveyor system will be described in relation to the orientation illustrated in FIG. 1, and consequently, terms such as "above," "below," "left," and "right," "upstream," "forward," and "rearward" etc., as used herein are to be construed in the relative sense. It is to be understood that although the present invention has been described using brake actuator units used in railway cars, the present invention is equally applicable to other spring loaded, pressure containing devices.

In accordance with various unique features described in detail below, the invention features a conveyorized system 10 in which a succession of stations are provided to rebuild disc brake actuator units and tread brake actuator units, hereinafter identified with reference characters DB and TB, respectively. These stations include a disassembly station 12 into which incoming fully assembled brake actuator units are brought for rebuilding. These units DB, TB are typically previously dismounted from railway car wheel trucks following what is typically 3 to 4 years of continuous, ongoing use in service. Following disassembly in the unique manner described below, the components are conveyored to a washer 90 where years of dirt and grime accumulation are cleansed from the parts. The various components of the units DB, TB are thereafter separated onto various other conveyors and delivered to a geographically common inspection area divided into sub-areas where one or more workers inspect various ones of the components and either recondition or replace the same, while other components (e.g. washers, O-rings, etc.) are discarded and replaced with new components.

Following inspection in area 114, the components are kitted by placement in baskets or similar vessels which will respectively contain an entire single set of components necessary for reassembly of one of brake actuator units DB, TB. Larger components (e.g. the actuator housings) are not necessarily kitted in the same basket with the smaller components. The kitted components are conveyored on separate disc and tread brake conveyor lines 146A, 146B to a common assembly area for reassembly and testing.

From FIG. 1A, which is an exploded perspective view of a representative disc brake DB (see table below including parts list for Wabco disc brake actuator) that is rebuilt on the conveyorized system 10 of the invention, it can be seen that the units are relatively heavy and bulky pieces of equipment, each typically having a total weight of 75–110 pounds including housings weighing between 40 to 50 pounds. Various components, such as piston 33A and piston sleeve 34A were initially threaded assembled together with an adhesive coating on the threads providing adhesive bonding as well as threaded retention between the components. In the prior art, unthreading of these components from each other was extremely difficult and possibly dangerous. Unique equipment is provided in this invention to safely and easily disassemble these components from each other, in turn allowing disassembly of other components described infra.

| ITEM NUMBER | DESCRIPTION |
|---|---|
| 1A | Small boot clamp |
| 2A | Large boot clamp |
| 8A | Dust boot |
| 29A | 1/8 Plug |
| 47A | Retaining ring |
| 54A | Piston rod |
| 48A | Load ring retaining washer |
| 49A | Friction ring |
| 50A | Load ring |
| 51A | Spacer |
| 52A | Washer |
| 53A | Rod scraper |
| 20A | Retaining ring |
| 22A | Anti-rotation plug |
| 21A | O-ring |
| 23A | Elastic stop nut |
| 24A | square nut |
| 25A | Stud |
| 26A | Spacer |
| 9A | 3/8" x 3/4" socket head cap screws |
| 16A | Anchor ring |
| 13A | Breather vent |
| 10(A) | Anchor ring gasket |
| 10A | O-ring |
| 11A | O-ring |
| 12A | Pipe plug 3/8" |
| 15A | Reducing bushing |
| 30A | 5/16" x 1/2" socket head cap screw |
| 31A | Stop key |
| 17A | Retaining ring |
| 18A | Reducing bushing |
| 27A | Flange |
| 28A | Return spring |
| 40A | 4-7/32" O.D. washer |

-continued

| ITEM NUMBER | DESCRIPTION |
| --- | --- |
| 19A | Cylinder body |
| 32A | Piston packing |
| 33A | Piston |
| 34A | Sleeve |
| 35A | ⅜" elastic stop nut |
| 36A | Disc spring |
| 37A | Thrust nut |
| 38A/45A | Bearing |
| 39A | Washer |
| 41A | Spring housing |
| 42A | Spring |
| 56A | Guide tube |
| 43A | Retaining ring |
| 44A | Washer |
| 46A | Shoulder bushing |
| 55A | Regulating screw |

Still other components on disc brake DB such as elements 35A–41A are secured together on regulating screw 55A under tension of spring 42 in a subassembly requiring disassembly in station 12. Another unique machine discussed infra is utilized to further compress the spring 42A and enable safe and easy removal of stop nut 35A from the threaded end of regulating screw 55A to facilitate disassembly of the aforementioned components held in place between the spring and nut.

Disassembly Station

The disassembly station, generally indicated at 12, includes a first receiving platform 14 for receiving disc brakes (DB) loaded on palettes. A second receiving platform 16 receives tread brakes (TB) which may also be loaded on palettes. A 12 ft. high bridge crane 13 is used to transfer DB and TB brake actuator units from the respective palette to either a disc brake actuator disassembly line 18, or a tread brake disassembly line 20. Both of these disassembly lines 18, 20 are geographically located in adjacent sub-areas of a common area that enables the same worker, or group of workers, to selectively work on disassembly of both tread and disc brake actuators.

In the disc brake disassembly side line 18 of the station 12, a split conveyor 22 is sized (e.g. four to six feet in length) to receive four disc brake actuators. Split conveyor 22 is a series of short idler rollers. The idler rollers have horizontal axis of rotation and are arranged in laterally spaced relation to each other. The rollers are recessed below upper surfaces of parallel side rails (not shown in detail) spaced from each other by a distance slightly greater than the roller lengths. The cylinder body or housing 19 of disc brake DB is disposed on the roller and loosely captured by the side rails for positive retention on the split conveyor 22.

The disc brake actuators DB are initially stored on rollers 22 and the actuator is partially disassembled. Such disassembly is achieved with conventional predetermined disassembly tools as known in the art, as well as various unique machines discussed infra. A work table 24 is adjacent the downstream end of split conveyor 22, preferably at the same height for ease of transfer, and has two openings 25, 26 with two vertically movable plates 27, 28 respectively located within recesses 25, 26 in table 24. Plates 27, 28 have diameters slightly greater than the diameter of the disc brake housings 1a in FIG. 1A which are received on the plates and have pneumatic cylinders underneath so that the disc brake unit can be automatically lowered and raised by the movement of a lever located at the work bench. Lowering the disc brake unit locks the disc brake unit in place so that the cover can be torqued relative to the housing and disassembled. Preferably and advantageously, recesses 25, 26 are sized to fit several different types of disc brake actuator housings, such as those manufactured by Knorr and Wabco, thereby ensuring use of the same work area for equipment made by different manufacturers.

Figure 1A:
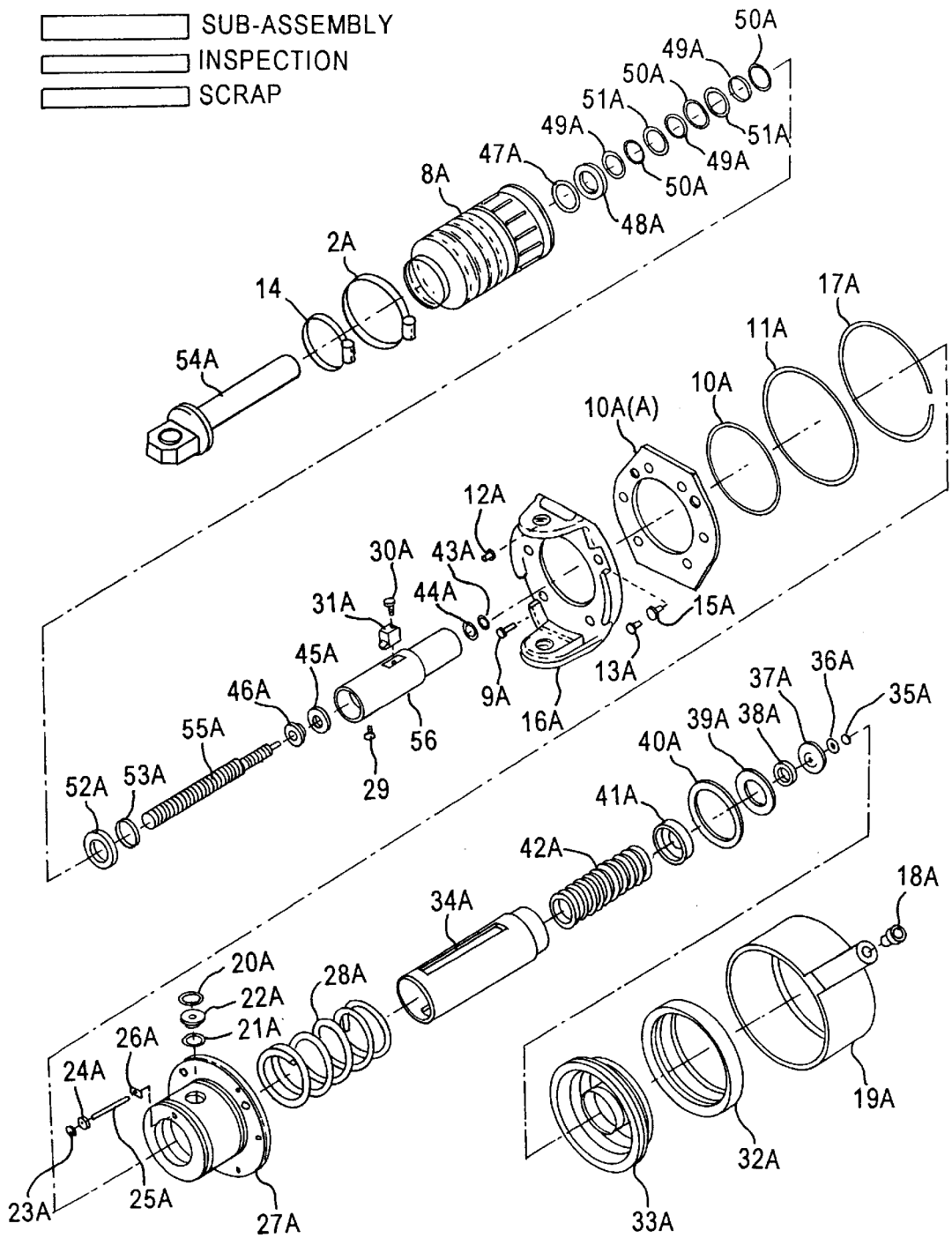
FIG. 1A is an exploded perspective view of a Wabco disc brake actuator.

A representative disc brake activator unit is illustrated in FIG. 1A, wherein a Wabco 3-P Amfleet II disc brake actuator is depicted in exploded view. For the sake of description, certain elements labeled throughout the specification will have a capital A following the reference numeral, indicating that these components are part of the Wabco 3-P disc brake illustrated in FIG. 1A. It should be understood that the Wabco 3-P disc brake is being discussed herein for the sake of clarity of explanation and the invention is not limited to the Wabco disc brake discussed herein.

After the brake actuator has been disassembled, each of the disassembled components will either be sent to a subassembly area, to an inspection area or to scrap. Using the Wabco 3-P disk brake depicted in FIG. 1A as an example, reference nos. 54, 1, 2, 47, 48, 51, 52, 55, 46, 45, 29, 56, 31, 30, 44, 9, 17, 20, 22, 28, 34, 42, 41, 40, 39, 38, 37, 33 are sent to the subassembly area. Reference nos. 8, 49, 50, 10A, 10, 11, 23, 24, 25, 26, 36, 35, 32 are sent to scrap. Part nos. 16, 12, 15, 27, 19, 18 are sent to the inspection area.

Figure 2:
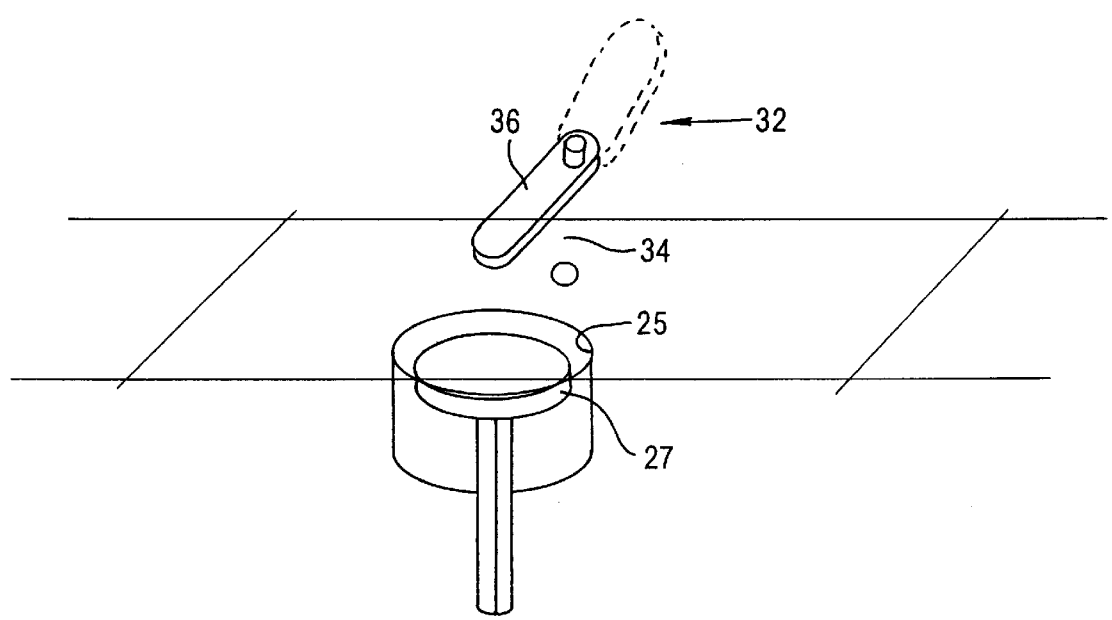
FIG. 2 is a perspective view of a disassembly work bench and clamping arrangement in the disc brake disassembly area.

As depicted in FIG. 2, a rotatable clamp 32 is vertically adjacent to recess 25 in table 24. Although not illustrated, another rotatable clamp is adjacent to recess 26. Rotatable clamps 32 have a vertical support 34 and a horizontally extending clamping section 36 extending from the upper end of vertically extending support 34. Horizontally extending clamp 36 is sized so as to be rotatable over recess 25 about a vertical axis of rotation extending through portion 36 to prevent the upward movement of the cover due to spring force when the disc brake actuator is disassembled.

Following partial disassembly, clamping section is rotated by the worker to the phantom line position of FIG. 2. The partially disassembled disc brake is then transferred by the worker from work bench 24 to a disassembly area 35. In accordance with a unique feature of this invention, disassembly area 35 includes a novel spring removal device, generally indicated at 36 (FIG. 3) and a novel, high torque thread loosening/removal device, generally indicated at 38 (FIG. 4).

Figure 3A:
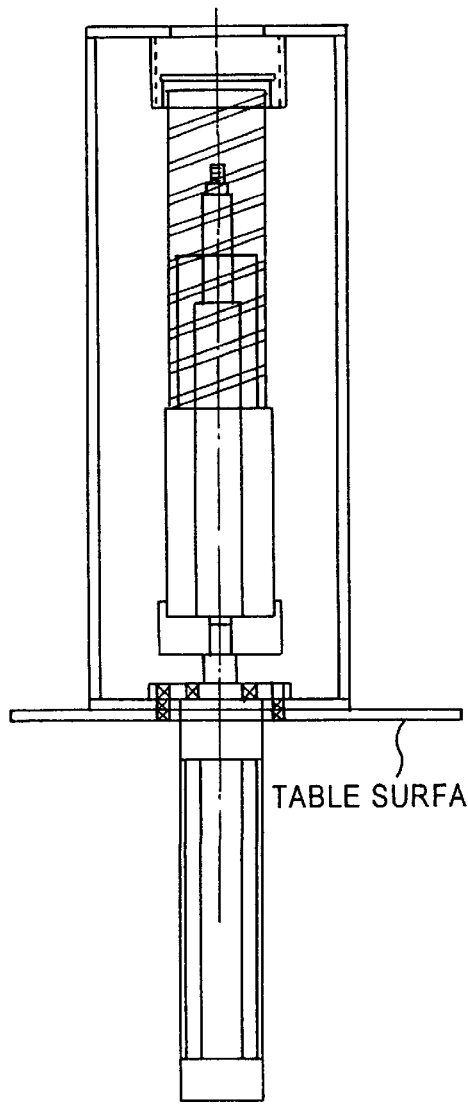
FIG. 3A is a front elevation of an apparatus for compressing a spring in a subassembly of a disc brake actuator to permit disassembly of various component parts thereof.
Figure 3B:
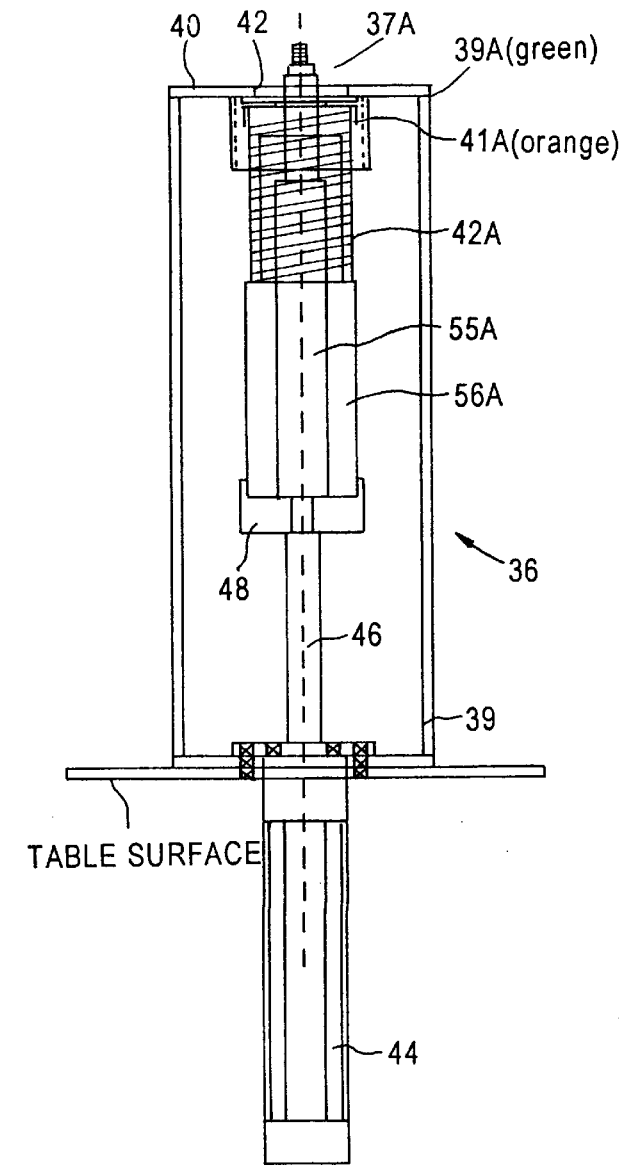
FIG. 3B is a view similar to 3A with the spring further compressed to relieve tension of fastener elements requiring removal.

As depicted in FIG. 3, the spring removal device 36 is used to separate components 36A, 37A, 38A, 39A, 41A, 42A, 55A and 56A from each other in referring back to FIG. 1A. Spring removal device 36 includes a cylindrical housing 39 vertically mounted to a horizontally extending table surface 39a (preferably located at same or similar height to table top 24) and a top plate 40 having a cylindrical hole 42 extending therethrough. A hydraulic or pneumatic cylinder 44 extends below the table surface 39a and has an upwardly extending piston rod 46 extending through the table surface. A cup 48 having an upwardly directed cavity 49 into which guide tube 56A is mounted is disposed on the upper end of piston rod 46.

The spring removal cylinder housing 39 includes an opening in the cylindrical sidewall thereof to enable guide tube 56A to be disposed within cup 48 when the piston rod 46 is in its retracted position depicted in FIG. 3A. At this point, the aforementioned subassembly components are under normal spring tension of spring 42. A pneumatic cylinder 44 is then actuated to extend piston rod 46 and thereby lift the subassembly in the direction of top plate 40. Cylinder 44 may also be a hydraulic cylinder. The upper end of the subassembly is captured by the top plate 40 which causes further compression of the spring. The entire spring force is transferred to the stationary top plate 40 and the stop nut 35A is elevated upwardly through the opening in the top plate 40 for easy access and removal by a worker. In this manner, the subassembly components identified hereinabove can be easily removed without any spring force being applied thereto during the removal process. The thusly disassembled components may be dropped into a basket for subsequent conveyance to a washer unit described hereinbelow.

Figure 4A:
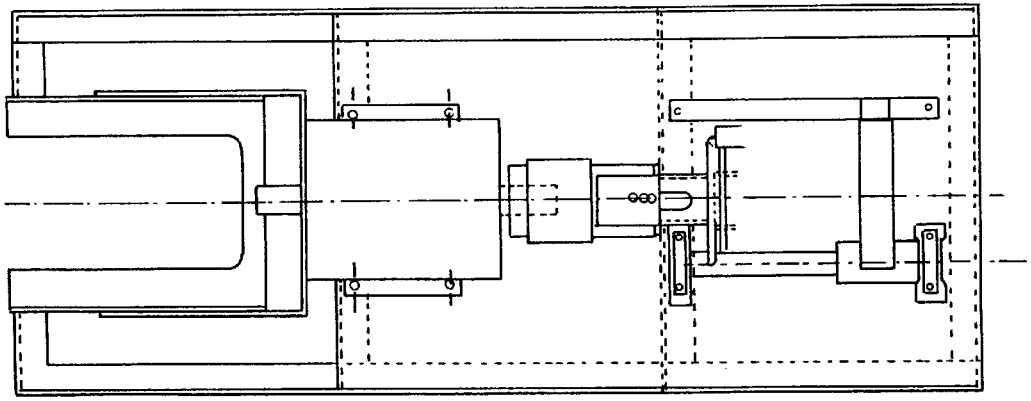
FIG. 4A is a top plan view of FIG. 4.
Figure 4B:
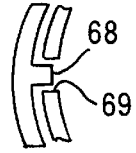
FIG. 4B is an enlarged sectional view taken along the line 4B—4B of FIG. 4.
Figure 4:
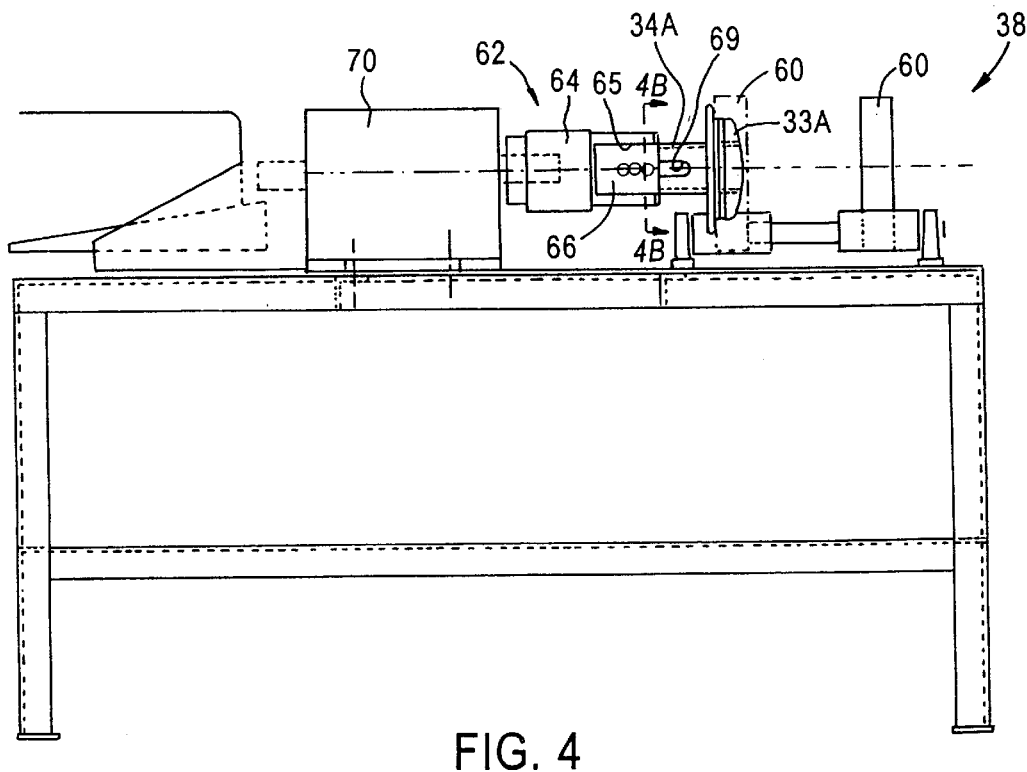
FIG. 4 is a front elevation view of a second apparatus used for disassembly of a further subassembly of the disc actuator with the subassembly operatively mounted to the second apparatus.

In FIG. 4, the torque removal device 38 (also preferably located at the same or similar height as table top 24) is depicted with piston head 33A and piston sleeve 34A operatively mounted within the device 38. As discussed briefly above, piston sleeve 34A is threadedly and adhesively engaged with piston head 33 A. A split clamp 60 engages piston head 33A to prevent movement thereof. Piston sleeve 34A is inserted into a collar 62 having a cylindrical sleeve retaining portion 64. Cylindrical portion 64 has a cut out 65 into which a key way portion 66 is inserted. Key way portion 66 includes a key way 68 (see FIG. 4A) which is inserted into an elongated slot 69 in piston sleeve 34A. A standard gear motor 70 is attached to the table and applies a driving torque to cylindrical portion 24 through an output shaft having an horizontal axis of rotation R. Rotation of gear motor 70 causes collar 62 to rotate piston sleeve 34A so as to unlock the threads and advantageously cause a separation of piston head 33A and piston sleeve 34A.

Referring again to FIG. 1 and the disc brake line 18, a vertically movable lift table 80 is advantageously positioned adjacent to table 24. When disc brake actuators are being disassembled, lift table 80 is positioned in a lower position (e.g. coelevational with table top 24) so that the smaller parts can be put directly into a basket positioned on lift table 80. Heavy or bulky parts (e.g. housings) may be positioned directly onto table 80 without being basketed. After disassembly is complete, lift table 80 can be raised to a position corresponding to a second driven conveyor 84. Second conveyor 84 conveys parts to an automatic washer 90.

Conveyor 84 includes a straight portion 86 and an angled portion 88 which merges with a conveyor from the tread brake line 20 as discussed below.

Returning to the tread brake line 20, a split conveyor is also preferably disposed at the beginning of the line. A tread brake disassembly table 94 is adjacent thereto. Table 94 may have a flat table top on which, for example, up to four tread brake actuator units may be simultaneously disposed for disassembling. Adjacent to tread brake disassembly table 94 is a lift table 96 having a lower position in which parts are loaded therein and an elevated position at the same height as a conveyor portion 98. Conveyor portion 98 merges at a Y juncture 100 with conveyor portion 88 of the disc brake line and a common conveyor portion 102 extends between Y juncture 100 and parts washer 90 for successive conveyance of disassembled components thereto.

Cleaning of Components

A photo eye 104 is positioned on common conveyor 102 to activate washer 90 for a particular time period. Baskets 101 proceed through the washer 90 on the conveyor 102 through several stages of washing, including a wash, rinse, and another rinse after that. Washer 90 may be of conventional construction.

Transfer Inspection Station

After exiting washer 90, baskets 101 enter a transfer conveyor section 106. There are photo eyes 108 mounted adjacent the upper run of conveyor 106 that determine the size of the basket and then subsequently transfer the basket to one of three conveyors 109, 110 or 112. Preferably, therefore, baskets of one size are used to convey disc brake components while baskets of a different other size are used for tread brake components. Conveyor 108 will transfer disassembled disc brake components to a sub-component assembly area 140 on a cross conveyor 109. Conveyor 110 transfers both disc and tread brake components parts to an inspection area, generally indicated at 114. A third conveyor section 112 will continue a third size basket to the end of the washer exit conveyor. This third conveyor 112 is preferably used to route washed parts which are generally not components used in the rebuild process.

A first pop up transfer chain 116 is located at the end of conveyor portion 108 to transfer certain disc components to conveyor 109. A second pop up transfer chain 118 feeds components to conveyor 110. Both chains 116, 118 are controlled by photo cells to elevate into the path of conveyor portions 106 and 112, depending on the type of basket, such that the basket is automatically transferred to either conveyor 109, 110 or 112.

Typically, smaller parts are conveyed on lower conveyor 109 while larger parts are conveyed on conveyor 110. A parts basket on conveyor line 110 is transferred to inspection area 114. In the inspection area 114, for example, bushings can be pressed out of the disc brake actuator in a conventional 55 ton hydraulic press 122. Various surfaces within the brake actuator are deglazed and honed as well in the inspection area. Housings in which honing would not satisfactorily restore the surfaces are placed in storage cabinets 120 so that these housings can be sent out to a machine shop to have their surfaces restored. Housings are transferred from conveyor 110 to a work bench 124.

Parts transferred on conveyor portion 110 stop at lift table 126 and are moved to work bench 124. A parts basket 128 is then lowered on lift table 126 to a lower conveyor basket return 128 which then returns the baskets 128 to the disassembly area 12.

Returning to conveyor 108, baskets of different sizes are conveyed to a subassembly area, generally indicated at 140. Subassembly area 140 includes a disc brake actuator assembly area, generally indicated at 142, and a tread brake subassembly area generally indicated at 144.

Inspected and reconditioned housings are transferred from the inspection/reconditioning area 114 to either subassembly area 142 or 144. A lower conveyor 146A transfers components to tread side subassembly area 142 while a lower conveyor 146B transfers parts to disc side subassembly area 144. A return conveyor 148 returns baskets to the inspection/reconditioning area 114. In subassembly areas 142 and 144, complete reconditioned disc brake actuators are at least partially assembled on subassembly tables 150 and 152, respectively. Further assembly occurs on assembly bench 160 which is at the terminal end of conveyors 146A and 146B.

After assembly is complete, the disc and tread brake actuators are tested at reference number 170. An application entitled "APPARATUS AND METHOD FOR TESTING BRAKE ACTUATOR UNITS USED IN RAILROAD CARS," filed on even date herewith, and assigned to the Assignee of the present application, is incorporated by reference in its entirety into the specification. The details of the test procedures and test equipment are explained in great detail in the aforementioned U.S. patent application incorporated by reference.

It should be noted that the process described hereinabove utilizes batch sizes of four brake actuators, whether tread type or disc type. This is because each passenger car wheel truck has four disc brakes and four tread brakes.

It will be readily seen by one of ordinary skill in the art that the present invention fulfills all the objects set forth above. After reading the foregoing specification, one of ordinary skill will be able to affect various changes, substitution of equivalents and various other aspects of the invention as broadly disclosed herein. It is, therefore, intended that the protection granted hereon be limited only by the definition contained in the appended claims and the equivalents thereof.

What is claimed is:

1. A conveyorized system for disassembling, inspecting and rebuilding brake activator units used on railway cars, comprising:

a. a disassembly station including a series of predetermined disassembly tools which are worker operated to disassemble a said unit into component parts;

b. an inspection station including a series of predetermined inspection tools which are worker operated to inspect predetermined parameters on selected ones of said components;

c. a repair station including a series of predetermined repair tools to repair said predetermined ones of said components;

d. an assembly station including a series of predetermined assembly tools to reassemble said unit with said inspected and repaired and/or replaced components; and e. multilevel conveyors between at least selected ones of said stations for conveyance of said component parts therebetween, wherein each station includes first and second sub-areas respectively containing separate sets of said predetermined tools to respectively enable the disassembly, inspection, and reassembly of tread brake activator units and disc brake activator units in the respective sub-areas as separate capabilities of the stations, wherein the multilevel conveyors are used to convey the component parts separately within the connected ones of the first sub-areas and the second sub-areas of the respective stations, said conveyors thereby including separate conveyor lines associated with the respective sub-areas.

2. The conveyorized system of claim 1, further comprising a plurality of vertically moveable surfaces for transferring components between selected ones of said stations and an in-feed location of one of said conveyors associated therewith.

3. The conveyorized system of claim 1, further comprising basket means receiving selected ones of said components for placement on, and conveyance along, an associated one of said conveyors to the next station.

4. The conveyorized system of claim 1, further comprising a washer, located between the disassembly station and the inspection station, to which disassembled brake and tread components are conveyorized for washing.

5. The conveyorized system of claim 4, further comprising separate tread and disc brake conveyors extending from the disassembly station and being merged into at least one conveyor extending through the washer.

6. The conveyorized system of claim 5, wherein said one conveyor includes means for transferring tread and disc components from said one conveyor onto separate conveyors extending in the inspection station.

7. The conveyorized system of claim 1, further comprising a brake test fixture including a test bench having a mounting section to which the assembled brake activator unit is mounted, and control means for supplying pressurized air to said assembled unit and determining whether air pressure leakage occurs in the reassembled unit under a predetermined test pressure condition.

8. The conveyorized system of claim 1, wherein at least two components of a unit to be disassembled are threaded together and the threads of the components of the unit being disassembled are secured together by at least partial welding and/or adhesive material, one of said predetermined disassembly tools including:

(i) a clamp arranged to clamp one of said at least two components to secure the same against rotation; and (ii) a motor including an output shaft having means for connection to the other of said at least two components, whereby rotation of said shaft by said motor is operable to generate predetermined sufficient torque to unthread the components from each other.

9. The conveyorized system of claim 8, wherein said connection means includes a keyway interacting with said other component to interlock therewith and thereby impart rotative force from the motor through the shaft.

10. A conveyorized system for disassembling, inspecting and rebuilding brake activator units used on railway cars, comprising:

a. a disassembly station including a series of predetermined disassembly tools which are worker operated to disassemble a said unit into component parts;

b. an inspection station including a series of predetermined inspection tools which are worker operated to inspect predetermined parameters on selected ones of said components;

c. a repair station including a series of predetermined repair tools to repair said predetermined ones of said components;

d. an assembly station including a series of predetermined assembly tools to reassemble said unit with said inspected and repaired and/or replaced components; and e. conveyors between at least selected ones of said stations for conveyance of said component parts therebetween, wherein said brake activator units include spring biased components, said disassembly station including means for manipulating a spring in said unit to remove spring force from a fastener in said unit to facilitate removal of the fastener and thereby the spring and selected ones of said components from the unit held together between the spring and fastener.

11. The conveyorized system of claim 10, wherein said manipulating means includes a cylinder operated plunger arranged to compress the spring.

12. A production line assembly for disassembling, inspecting and rebuilding brake activator units used on railway cars, comprising:

(a) a disassembly station including a series of predetermined disassembly tools which are user operated to disassemble a said unit into component parts;

(b) an inspection station including a series of predetermined inspection tools which are user operated to inspect predetermined parameters on selected ones of said components;

(c) a repair station including a series of predetermined repair tools to repair said predetermined ones of said components;

(d) an assembly station including a series of predetermined assembly tools to reassemble said unit with said inspected and repaired and/or replaced components; and wherein said stations include first and second sub-areas respectively containing separate sets of said predetermined tools to enable the disassembly, inspection, and reassembly of tread brake activator units and disc brake activator units in the respective sub-areas.

13. The production line of claim 12, further comprising multi-level conveyors between at least selected ones of said stations for conveyance of said component parts therebetween.

* * * * *